Figure 1:
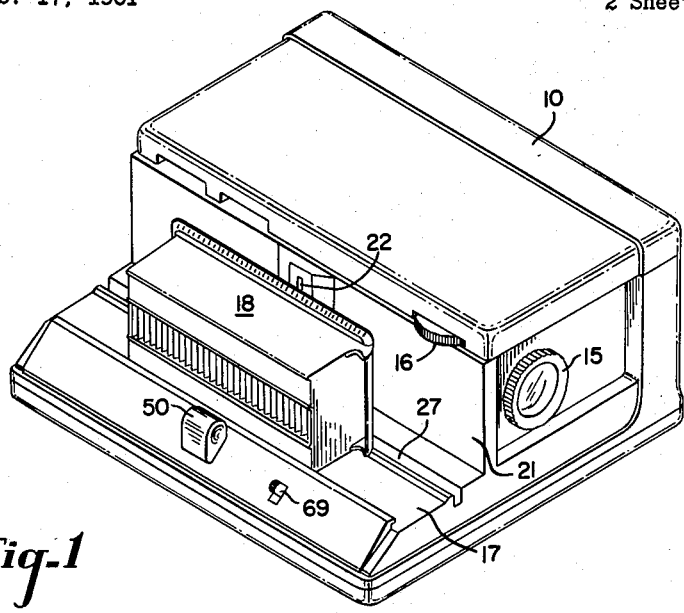

Dec. 31, 1963   R. F. McCAMMON   3,115,810
TRAY ADVANCING MECHANISM IN A PICTURE SLIDE PROJECTOR
Filed Feb. 17, 1961   2 Sheets-Sheet 1

INVENTOR.
ROBERT F. MC CAMMON
BY
ATTORNEY

Dec. 31, 1963  R. F. McCAMMON  3,115,810
TRAY ADVANCING MECHANISM IN A PICTURE SLIDE PROJECTOR
Filed Feb. 17, 1961  2 Sheets-Sheet 2
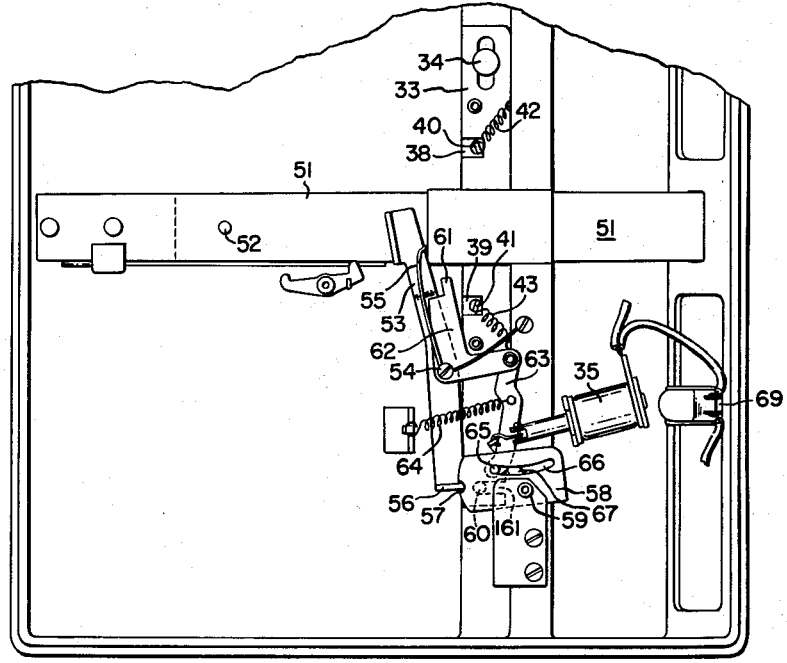
Fig.3
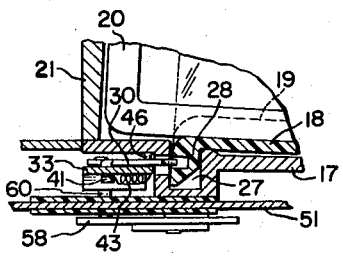
Fig.6
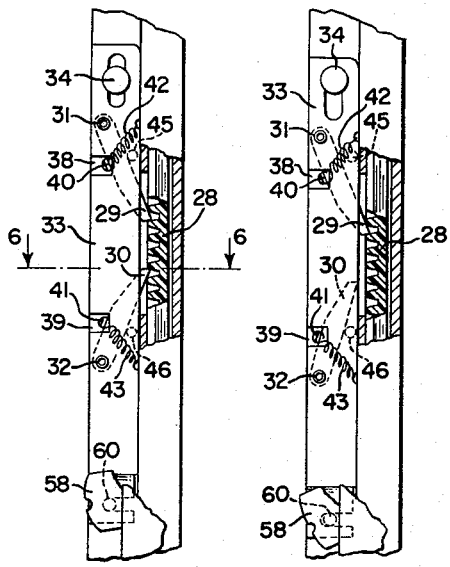
Fig.4  Fig.5  Fig.7
INVENTOR.
ROBERT F. MC CAMMON
BY
ATTORNEY United States Patent Office 3,115,810
Patented Dec. 31, 1963

3,115,810
TRAY ADVANCING MECHANISM IN A PICTURE SLIDE PROJECTOR
Robert F. McCammon, Denver, Colo., assignor to Minneapolis-Honeywell Regulator Company, Minneapolis, Minn., a corporation of Delaware
Filed Feb. 17, 1961, Ser. No. 89,986
7 Claims. (Cl. 88—28)

The present invention is concerned with a photographic projector and particularly with an improved slide tray advancing mechanism for such a projector. The present invention pertains to a slide projector of the type in which a plurality of individual photographic slides are stored in a slide tray, the slide tray being adapted to be positioned on a slide tray platform of the photographic projector. The photographic projector incorporates slide changing means which in one manner or another, engages the individual slides within the tray and moves these slides from the tray to the projection compartment of the projector. After the slide is displayed on a screen or the like, the slide may be returned to the slide tray, the slide tray advanced by means of a slide tray advancing mechanism, and a succeeding slide moved into the projection compartment of the projector to likewise be displayed. Furthermore, means may be provided to selectively drive the slide tray in one direction or the other to change the direction of movement of the slide tray and display a slide which has previously been displayed on the screen.

The apparatus of the present invention incorporates a very simple and yet reliable slide tray advancing mechanism using opposed drive pawls hinged to a member which is movable in a direction parallel to the movement of the slide tray and in which stop members are provided to lift one or the other of the opposed drive pawls out of engagement with a gear rack on the slide tray and thereby leave the other of the drive pawls in engagement with this gear rack to facilitate movement of the slide tray. With such a construction, so long as a slide is positioned at the projection compartment of the projector and is being displayed on the screen, then both of the drive pawls engage the gear rack on the slide tray and the slide tray is effectively locked in position to prevent inadvertent movement of the slide tray. If such movement should take place, of course, the slide presently being displayed on the screen would be returned to the slide tray and jamming would occur since the compartment to which this slide was to be returned would already be occupied by a slide. Thus, the apparatus of the present invention not only provides a very simple and fool-proof means of driving the slide tray, but also provides a means for locking the slide tray when it is desirable to do so.

Figure 2:
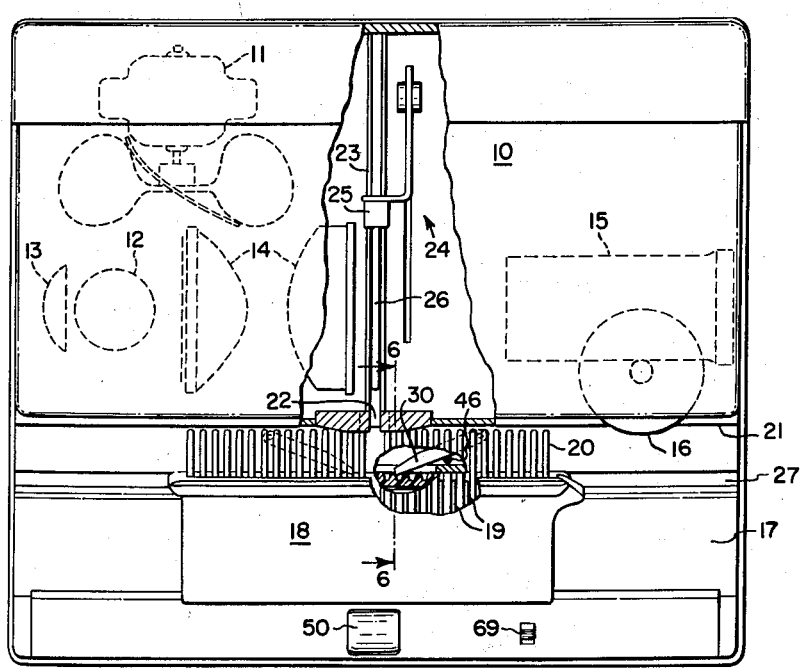

The present invention will be apparent to those skilled in the art upon reference to the following specification, claims and drawings, of which:

FIGURE 1 is a perspective view of a slide projector,
FIGURE 2 is a top view of the projector of FIGURE 1, having a portion of the housing broken away to display the projection compartment and also having a portion of the slide tray and the slide tray platform broken away to disclose the engagement of one of the drive pawls with the gear rack in the slide tray,
FIGURE 3 is a bottom view of the slide projector, showing the drive mechanism, including portions of the slide changing mechanism,
FIGURES 4 and 5 are bottom views, similar to FIGURE 3, but showing only the slide tray advancing mechanism in two positions of operation, the position of FIGURE 4 being that in which the slide tray is locked and the position of FIGURE 5 being that in which the slide tray has been driven by the upper drive pawl,
FIGURE 6 is a section view of FIGURE 4, more clearly showing the engagement of the drive pawl and the gear rack of the slide tray, and
FIGURE 7 is a view of the reversing mechanism, showing the mechanism in a different position than that shown in FIGURE 3.

Referring now to FIGURE 1, reference numeral 10 designates generally a photographic projector housing which houses a blower 11 (see FIGURE 2), a lamp 12 and its reflector 13, a condensing lens system 14, and a movable objective lens 15. The movable objective lens 15 is movable by means of a manual control knob 16.

Reference numeral 17 designates a slide tray platform adapted to receive a slide tray 18, which slide tray has individual slide compartments formed by way of separators 19 (see FIGURE 2) and holding individually spaced photographic slides 20.

Reference numeral 21 designates a side wall of the photographic projector which borders the slide tray platform 17 and is provided with a slide receiving window 22. As can be seen in FIGURE 2, the slide receiving window 22 cooperates with a slide guide 23 and slide changing mechanism designated generally by means of reference numeral 24. This slide changing mechanism may take a variety of forms and in the present application this slide changing mechanism may be of the type incorporating a permanent magnet 25 which engages the individual slides 20, these slides either being provided with a clip of magnetic material or being mounted in a mounting which is made of magnetic material. In the showing of FIGURE 2, an individual slide 26 is shown positioned at the projection compartment of the projector and in alignment with the optical axis as defined by the members 12–15. Thus, this slide is in a position to be projected on a screen or the like.

Reference numeral 27 designates a channel formed in the slide tray platform 17 and this channel is adapted to receive a portion of the slide tray 18, which portion includes a gear rack identified generally by means of reference numeral 28 (see FIGURE 6). This gear rack 28, which as can be seen quite clearly in FIGURES 4 and 5, is provided with spaced gear teeth which are spaced a distance equivalent to the spacing of the individual slides 20 within the slide tray 18. The slide tray advancing mechanism constitutes a pair of opposed drive pawls 29 and 30, the drive pawl 30 being seen from a bottom view in FIGURES 4 and 5 and being seen from a top view in FIGURE 2. The drive pawls 29 and 30 are loosely pivoted at 31 and 32 to a movable member in the form of a bar 33. This bar 33 is mounted in a movable fashion by means including a stationary pin 34 which cooperates with an elongated slot formed in bar 33. Thus, bar 33 may move in either direction from the mid-position shown in FIGURE 4. In FIGURE 5 this bar is shown has having moved downward and, as will be explained, in the event that the reversing solenoid, identified by means of reference numeral 35 in FIGURES 3 and 7, is energized, as shown in FIGURE 7, then bar 33 would have moved in an upward direction such that pin 34 would engage the bottom of the elongated slot, rather than the top as shown in FIGURE 5.

Bar 33 is further provided with a pair of cutouts 38 and 39, these cutouts receiving a pair of ears 40 and 41 formed in the drive pawls. The ears 40 and 41 are engaged by spring biasing means 42 and 43 to bias the drive pawls for rotation about their respective pivots. The underside of the slide tray platform 17, as seen in FIGURE 6, is provided with a pair of stationary stop members 45 and 46, the stop member 46 being seen in FIG- URE 6. These stop members 45 and 46 provide stops for the drive pawls and the drive pawls are biased for rotation about their respective pivots to engage the stops when the bar 33 is in the neutral position as shown in FIGURE 4. Also, stop members 45 and 46 define an elongated opening through which end portions of the pawls 29 and 30 extend to engage the gear rack 28. Thus, as shown in FIGURE 4, the gear rack 28 of the slide tray 18 is engaged by the opposed pawls 29 and 30 and thus the movement of the slide tray in either direction is resisted by this locking action of the pawls 29 and 30. As will be more completely explained, after a slide is returned to the slide tray 18, the bar 33 is moved, in accordance with the state of energization of reversing solenoid 35. Thus, in FIGURE 5, bar 33 is shown as moved in a downward direction. This downward movement causes stop 46 to engage drive pawl 41 and to lift this pawl out of engagement with gear rack 28. Drive pawl 29 remains in engagement with the gear rack and the downward movement of bar 33 thus causes the slide tray to also move in a downward direction, indexing the slide tray and moving a further slide into position at the slide window 22. Relating the movement of FIGURE 5, which is a bottom view, to that of FIGURE 2, downward movement of bar 33 and thus downward movement of the slide tray corresponds to a movement to the right in FIGURE 2.

As has been pointed out, the specific construction of the slide changing mechanism is not pertinent to the present invention. However, the specific slide changing mechanism shown is a manual type in which a manual control knob 50, as seen in FIGURES 1 and 2, controls the movement of a bar 51, seen in FIGURES 3 and 6. Bar 51 carries a stationary stop member 52 which is adapted to engage a locking lever 53, pivoted at 54 and biased for counterclockwise rotation about its pivot by means of a spring 55. Member 53 is provided with a locking extension 56 at its lower end and this locking extension engages a notch 57 formed in a pivoted plate 58, the plate being pivoted at 59. The underside of plate 58 carries a pin 60 which engages a notch 161 formed in the lower end of bar 33 and constitutes a means for driving bar 33. Thus, it can be seen that when plate 58 rotates in a counterclockwise direction about its pivot 59, bar 33 moves in a downward direction. When bar 58 rotates in a clockwise direction about its pivot, bar 33 moves in an upward direction.

A detailed explanation of the slide changing mechanism will not be made. It suffices to say that as bar 51, as seen in FIGURE 3, moves to the right, a slide such as 26 of FIGURE 2 is returned to the slide tray. Once the slide is returned to the tray, pin 52 engages the upper extremity of lever 53 and causes this lever to rotate about its pivot 54. The first movement of lever 53 causes the locking portion 56 of the lever to disengage notch 57 in plate 58. As rotation of rod 53 continues a portion 61 of a further lever 62 is engaged by a raised portion in lever 53 and the clockwise rotation due to movement of drive pin 52 is transmitted by means of a link 63 to drive plate 58 in a counterclockwise direction about its pivot 59, thus causing bar 33 to move in a downward direction and to drive or index the slide tray as seen in FIGURE 5. Link 63 is biased by means of a spring 64 such that upon reversing solenoid 35 being de-energized, a pin 65 carried by the lower end of link 63 is positioned at the left hand end of an arcuate slot 66 formed in plate 58. Energization of solenoid 35, as shown in FIGURE 7, causes a drive arm 67, also pivoted at 59, to be drawn in a clockwise direction and move the link 63 to the right hand end of the arcuate slot 66. Thus, it can be seen that movement of member 62, as controlled by pin 52, now causes plate 58 to rotate in a clockwise direction about its pivot 59 and thus bar 33 moves in an upward direction, causing the slide tray to move or index in a reverse direction, this being a direction to the left as shown in FIGURE 2. Energization of reversing solenoid 35 is controlled by a switch 69 which can be moved to a "forward" or a "reverse" position as selected by the projector operator.

From the above description it can be seen that I have provided an improved photographic projector utilizing a simple and foolproof slide tray advancing mechanism having opposed pawls 29 and 30 which, when in the position shown in FIGURE 4, are operative to lock the slide tray, and upon movement of bar 33 are effective, through the medium of the stops 45 and 46 to cause one of the drive pawls to disengage the rack formed in the slide tray and to cause the other drive pawl to index or move the slide tray.

Modifications of the present invention will be apparent to those skilled in the art, and it is, therefore, intended that the scope of the present invention be limited solely by the scope of the appended claims.

I claim as my invention:

1. In a slide tray advancing mechanism for a photographic slide projector, a slide tray adapted to hold a plurality of spaced photographic slides, a gear rack formed on a surface of said slide tray to facilitate movement of said slide tray as the slides therein are progressively projected upon a screen or the like, a pair of oppositely disposed drive pawls mounted on a movable member in engagement with said gear rack so that both of said pawls normally engage said gear rack and prevent movement of said slide tray in either direction, stop means for each of said pawls to lift one or the other of said pawls out of engagement with said gear rack upon movement of said movable member in one direction or the other, and means connected to said movable member to cause movement thereof in one direction or the other to thereby move said slide tray in one direction or the other through the medium of the one of said pawls which remains in engagement with said gear rack.

2. Slide tray advancing mechanism for use with a slide tray adapted to hold a plurality of individual photographic slides, and having a gear rack adapted to be engaged by the slide tray advancing mechanism, said mechanism comprising; a movable control member adapted to move in one direction or the other in accordance with the desired direction of movement of the slide tray, a pair of opposing drive pawls mounted on said movable member and biased to engage the gear rack in the slide tray to normally resist movement of the tray in either direction, and a pair of stationary stop members, one of which is associated with each of said pawls in a manner to cause one or the other of said pawls to be moved out of engagement with slide tray gear rack as said control member moves to thereby allow the other of said pawls to drive the slide tray.

3. Slide tray advancing mechanism, comprising: a slide tray having a plurality of individual photographic slides held in a side by side relationship and having a drive gear rack whose gear teeth are spaced to coincide with the spacing of the slides in said tray, a pair of stationary stop members spaced apart from each other, a movable control member movable generally parallel to said stop members, a pair of drive pawls pivoted on said control member at points spaced apart a distance greater than the spacing of said stop members, spring means biasing said drive pawls toward said stop members such that each of said drive pawls engages one of said stop members and said drive pawls extend between said stop members inclined toward each other in generally opposing relation, said drive pawls opposingly engaging the gear rack of said slide tray to oppose motion of said slide tray, and means adapted to move said control member to cause one of said drive pawls to be lifted out of engagement with said gear rack by means of its stop member, the other of said drive pawls remaining in contact with said gear rack to move said slide tray a distance equal to the spacing of the slides in said tray.

4. In a photographic projector of the type having a slide tray platform adapted to receive a slide storage tray holding a plurality of individual slides, which slide tray incldes a gear rack to facilitate movement of said slide tray, the projector also having slide changing means to selectively move one of the slides from the storage tray to a projection compartment, whereupon the slide can be projected on a screen or the like and subsequently returned to the slide tray, the improvement comprising; slide tray advancing means having a movable control member which is driven by the slide changing means, a pair of drive pawls movably mounted at spaced positions on said control member, a pair of stationary stop members spaced apart a distance less than the spacing of said drive pawls, and means biasing said drive pawls toward said stop members so that end portions of said drive pawls are inclined toward each other in generally opposed fashion and extend between said stop member to engage the gear rack of the slide tray to oppose motion of said slide tray, the slide changing means being effective to cause movement of said control member, whereupon one of said drive pawls is lifted out of the gear rack by means of its stop member and the other of said drive pawls remains in engagement with the gear rack to move the slide tray.

5. A photographic slide projector, comprising; a slide tray adapted to hold a plurality of spaced photographic slides disposed in a side by side attitude, a gear rack constituting a portion of said slide tray with the gear teeth spaced a distance substantially equal to the spacing of the slides within said tray; a projector housing including a slide tray platform and a window adapted to receive individual slides which are to be projected, said slide tray platform movably supporting said slide tray such that said slide tray may be moved and the slides therein may be selectively moved past said window; an elongated opening adjacent said gear rack, a member movably mounted within said housing at a position adjacent said opening and movable generally parallel to said gear rack, a pair of drive pawls pivotally mounted on said movable member at spaced points which are spaced apart a distance which is greater than the length of said elongated opening, means biasing said drive pawls toward said opening such that an end portion of each of said pawls extends through said opening and engages said gear rack in opposing fashion to oppose motion of said slide tray and each of said pawls engages an end surface of said elongated opening, which end surface acts as a stop means for said pawls; and means effective to move said movable member to thereby cause one of said pawls to lift out of said gear rack as said one pawl moves toward an end surface of said opening which acts as a stop for said one pawl, the other of said pawls remaining in engagement with said gear rack to thereby move said slide tray a distance equal to the spacing of the slides within said slide tray.

6. In combination with a photographic slide projector having control means for operating a slide changing mechaism and having a photographic slide storage tray with a straight drive gear rack formed on a surface thereof; slide tray advancing means including a movable bar mounted for movement parallel to the drive gear rack and having a pair of oppositely disposed drive pawls movably mounted on said bar and biased to normally engage the gear rack to oppose motion of said slide tray; a pair of stop means, one associated with each of said drive pawls to cause one or the other of said drive pawls to disengage said gear rack depending upon the direction of movement of said bar to thereby cause the slide tray to be driven in one direction or the other; a pivoted plate member having a portion on one side of its pivot connected to said bar so that the direction of rotation of said plate member determines the direction of movement of said movable bar, and electrically energizable means selectively operable to control the application of an operating force from the control member to said pivoted plate on one side or the other of said pivot to thereby control the direction of rotation of said pivoted plate and thereby control the direction of movement of the slide tray.

7. In combination with a photographic slide projector having a control member operative to drive a slide changing mechanism through cycles of operation wherein individual photographic slides are moved from a slide tray to a projection compartment, and having a photographic slide storage tray with an elongated gear rack to facilitate movement of the storage tray; a movable bar mounted for movement parallel to the gear rack, a pair of oppositely disposed drive pawls movably mounted on said bar and biased to normally oppositely engage the gear rack to prevent inadvertent movement of the slide tray; a pair of stationary stop members, one associated with each of said drive pawls and operative upon movement of said bar to move one or the other of said drive pawls out of engagement with the gear rack whereupon the other drive pawl is operative to cause the slide tray to move as said bar moves; a further member cooperatively associated with the control member and said bar and selectively operable to cause said bar to move in one direction or the other depending upon the desired direction of movement of the slide tray; a locking member normally biased to lock said further member to prevent movement of said bar, and means associated with the slide changing means to control said locking member and to unlock said locking member at the time in the cycle of the slide changing means during which all photographic slides have been returned to the slide tray, to thereby facilitate subsequent movement of the slide tray.

References Cited in the file of this patent

UNITED STATES PATENTS

| | | |
|---|---|---|
| 114,829 | Kohl | May 16, 1871 |
| 564,466 | Briggs et al. | July 21, 1896 |
| 2,874,497 | Huff et al. | Feb. 24, 1959 |
| 2,979,987 | Brumley et al. | Apr. 18, 1961 |
| 3,023,669 | Hall | Mar. 6, 1962 |
| 3,025,759 | King | Mar. 20, 1962 |